United States Patent [19]

Shapiro

[11] 4,435,094

[45] Mar. 6, 1984

[54] THERMOMETER SCALE MAGNIFIER

[76] Inventor: Justin J. Shapiro, 620 Hearst Ave., Berkeley, Calif. 94710

[21] Appl. No.: 391,453

[22] Filed: Jun. 23, 1982

[51] Int. Cl.³ ............................................ G01K 1/06
[52] U.S. Cl. .................................. 374/191; 350/116; 248/295.1; 248/316 D; 73/327
[58] Field of Search ......................... 374/191; 73/327; 350/116; 248/295.1, 296, 316 D, 74 B, DIG. 4

[56] References Cited

U.S. PATENT DOCUMENTS

| | | | |
|---|---|---|---|
| 1,052,234 | 2/1913 | Gaertner | 248/296 X |
| 1,169,805 | 2/1916 | Gutenkunst | 248/296 |
| 2,389,282 | 11/1945 | Stegman | 374/191 X |
| 2,586,581 | 2/1952 | Tschischeck | 350/116 |
| 2,718,815 | 9/1955 | Manning | 350/116 |
| 3,762,799 | 10/1973 | Shapiro | 350/116 |

FOREIGN PATENT DOCUMENTS

| | | | |
|---|---|---|---|
| 119532 | 5/1958 | Fed. Rep. of Germany | 73/327 |
| 10936 | of 1903 | United Kingdom | 374/191 |

Primary Examiner—Gerald Goldberg
Assistant Examiner—Tom Noland
Attorney, Agent, or Firm—Herman L. Gordon

[57] ABSTRACT

A magnifying indicator for a thermometer or similar columnar instrument, said indicator consisting of a one-piece body of transparent plastic formed with a cylindrical base block and an upstanding lens on the front portion of the base block. Opposite the lens the base block is formed with a rearwardly-facing vertical V-groove in which the columnar instrument is receivable. A U-shaped wire spring is anchored at one side of the groove and transversely overlies the groove. The spring is arranged to allow the columnar instrument to be slipped into the groove so as to engage against the flat sides thereof and thereafter to clamp the instrument in the groove to prevent angular disorientation of the lens relative to the columnar instrument, while permitting sliding adjustment of the magnifying indicator along the instrument scale.

11 Claims, 5 Drawing Figures

THERMOMETER SCALE MAGNIFIER

FIELD OF THE INVENTION

This invention relates to magnifying scale indicators, and more particularly to a magnifying indicator for a thermometer or similar elongated tubular instrument having a linearly-extending scale.

BACKGROUND OF THE INVENTION

Various scale-magnifying devices have been previously proposed for use directly on a thermometer or on similar elongated instruments, such as barometric instruments, syringes, or the like. These previously proposed scale magnifiers are generally quite cumbersome, are difficult to attach to the instrument, cause scratching or other damage to the surface of the instrument which may obliterate its scale markings, are narrowly limited as to the size of the column on which they can be mounted, are difficult to adjust and read, do not have properly arranged fiducial lines, are relatively fragile, and are costly to fabricate. Typical examples of such previously proposed, directly-mounted mgnifying devices are disclosed in the following prior U.S. Pat. Nos.: Pratesi, 2,351,455; Stegeman, 2,389,282; Tschischeck, 2,586,581; Yin, 3,512,862; Viollet, 3,512,875.

There is a definite need for a directly attachable scale magnifier which does not have the above, and other, shortcomings of the presently known scale-magnifying attachments.

SUMMARY OF THE INVENTION

Accordingly, a main object of the present invention is to provide an improved directly-attachable scale magnifier for a thermometer, or similar elongated columnar instrument, which overcomes the deficiencies and disadvantages of the presently known scale magnifying attachments.

A further object of the invention is to provide a novel and improved scale magnifier which is easy to attach to a thermometer, or similar scale-bearing columnar instrument, which is compact in size, which is durable in construction, and which maintains a stable orientation on the columnar scale-bearing portion of the instrument.

A still further object of the invention is to provide an improved quick-mountable scale magnifier for a thermometer, or similar columnar scale-bearing instrument, which comprises a minimum number of parts, which is easy to assemble, which is very economical to fabricate, and which accurately maintains its intended orientation relative to the instrument on which it is mounted.

A still further object of the invention is to provide an improved scale magnifier which can be quickly mounted on a thermometer, or similar columnar scale-bearing instrument, and is accurately adjustable thereon with minimum risk of damage to the instrument, which can be mounted on a wide range of sizes of instrument columns, which provides a clear view of the instrument scale without parallax errors or other aberrations, and which includes cooperating convergent flat bearing surfaces receiving the columnar instrument therebetween and acting to positively maintain the correct orientation of the viewing lens of the magnifier relative to the linear scale of the instrument, namely, to maintain parallelism of the fiducial lines of the viewing lens with the scale lines of the instrument.

A still further object of the invention is to provide an improved scale magnifier comprising only two parts, namely, (1) a main component, which comprises a body which can be molded in one piece, of inexpensive transparent plastic material, such as acrylic plastic or Lexan, which is light in weight and has substantial physical strength; and (2) a relatively simple metal wire spring formed and arranged so that it can be quickly and securely attached to the main body, thus completing the assembly of the device, said spring acting to permit easy slidable engagement of a thermometer, or similar instrument, into a centering recess provided in said main body and acting to maintain the device in correct optical position with respect to the instrument scale while permitting the magnifier device to be easily moved along the column of the instrument.

BRIEF DESCRIPTION OF THE DRAWINGS

Further objects and advantages of the invention will become apparent from the following description and claims, and from the accompanying drawings, wherein:

DETAILED DESCRIPTION OF A PREFERRED EMBODIMENT

Figure 1:
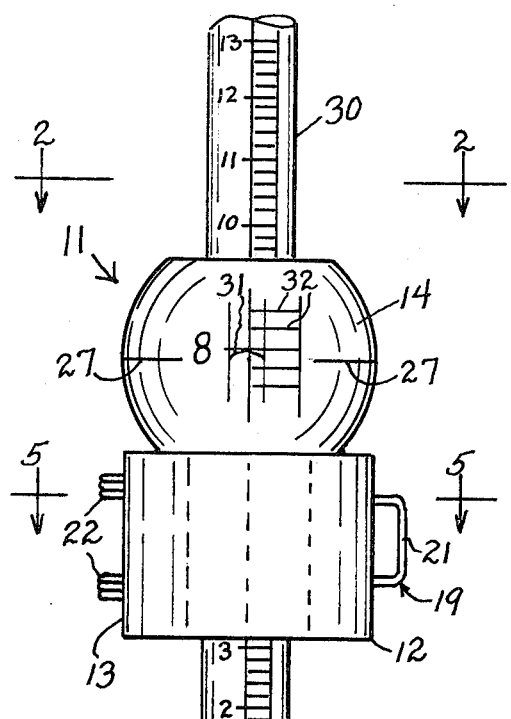
FIG. 1 is a front elevational view of an improved magnifying scale indicator according to the present invention, shown operatively mounted on the scale-bearing columnar portion of a conventional thermometer.
Figure 3:
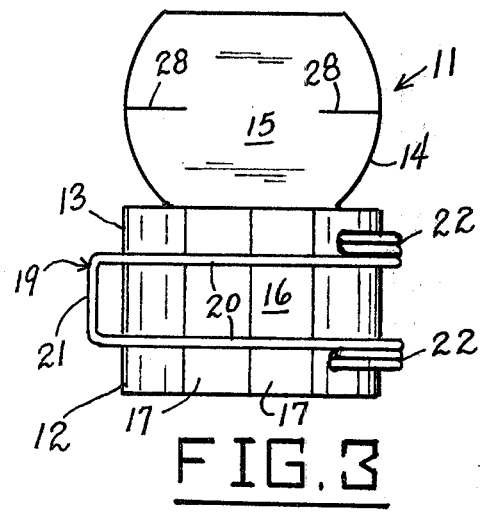
FIG. 3 is a rear elevational view of the magnifying scale indicator of FIG. 1.
Figure 4:
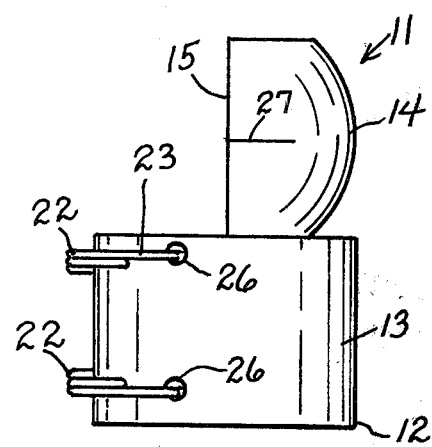
FIG. 4 is a side elevational view of the magnifying scale indicator of FIG. 1.

Referring to the drawings, 11 generally designates a thermometer scale magnifier according to the present invention. The magnifier 11 comprises a one-piece main body 12 of transparent material, such as molded transparent acrylic plastic, or Lexan, comprising a generally cylindrical base block 13 with an integral upstanding lens 14 rising from its forward top end portion. Lens 14 has a flat vertical back surface 15 located approximately in a diametral vertical plane of the cylindrical base block 13.

Figure 2:
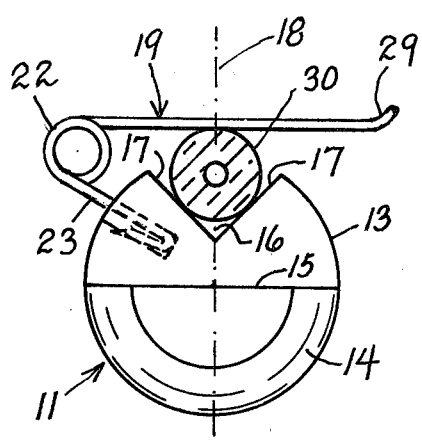
FIG. 2 is a horizontal cross-sectional view taken substantially on the line 2—2 of FIG. 1

The rear portion of base block 13 is formed with a right-angled vertical V-groove 16 with its corner located substantially in the common transverse median diametral vertical plane 18 of base block 13 and lens 14, so that the side faces 17, 17 are located symmetrically on opposite sides of said common median diametral vertical plane 18, as shown in FIG. 2. Faces 17, 17 preferably are at right angles to each other, although other corner angles may be employed.

Figure 5:
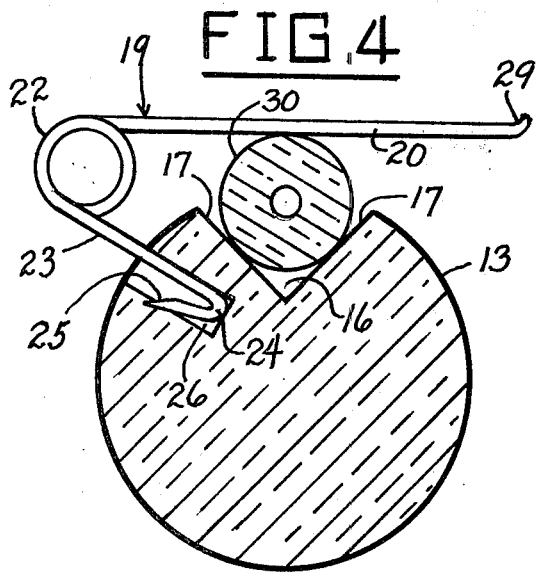
FIG. 5 is an enlarged horizontal cross-sectional view taken substantially on line 5—5 of FIG. 1.

Designated at 19 is a generally U-shaped metal wire spring member having the parallel spring arms 20, 20 and the transverse bight portion 21. The ends of spring arms 20, 20 comprise respective coiled portions 22, 22 terminating in anchoring arms 23 formed with respective resilient hooks 24 having sharp pointed ends 25. The resilient hooks 24 are lockingly received in respective upper and lower, generally cylindrical, vertically aligned, inwardly extending bores 26, 26 located at one side of V-groove 16, which have a diameter about three times that of the spring wire so that the resilient hooks 24 can spread sufficiently to cause the points 25 to penetrate into the walls of the bores 26 and thereby firmly anchor the arms 23 in said bores. Thus, the parallel arms 23, 23 are rigidly held in base block 13 after the hooks 24 are fully inserted into the bores 26, as shown in FIG. 5. The U-shaped portion of the wire spring member 19 extends transversely over and is biased toward the V-groove 16.

The front face of lens 14 is inscribed with opposite horizontal fiducial lines 27, 27 located in the horizontal median plane of the lens, and the rear face 15 of said lens is inscribed with similar opposite fiducial lines 28, 28 likewise located in said horizontal median plane. The respective pairs of index lines 27, 28 on opposite sides of the central area of the lens 14 can be visually aligned by the user to thereby eliminate parallax when using the magnifier 11.

The portions of arms 20 adjacent to bight portion 21 are outwardly curved, as shown at 29, to facilitate insertion of a thermometer column 30 between the U-shaped wire spring member 19 and the base block 13, when the scale magnifier is to be installed on a thermometer. Thus, the thermometer is pushed along the U-shaped spring arm until it is received in the V-groove 16 in the position shown in FIG. 2. The spring arm clamps the thermometer column 30 against the convergent flat groove faces 17, 17 but allows the magnifier 11 to be slidably adjusted along the column 30 to a desired observation position, for example, substantially in focus with the meniscus 31 and the adjacent thermometer scale portions, as shown in FIG. 1. By visually aligning the inner fiducial lines 28 with the outer fiducial lines 27, parallax error is minimized, as above explained.

In attaching the scale magnifier 11 to a thermometer 30, it is merely necessary to lift the spring member 19 at the free end portion thereof and then slide the thermometer 30 laterally between the spring arm and the base block 13 until the thermometer slips into the V-groove 16. This flexes the spring arm so that it resiliently grips the thermometer, as shown in FIGS. 2 and 5, but permits the magnifier to be slidably adjusted along the thermometer column.

It will be seen from FIGS. 2 and 5 that the spring member 19 constantly urges the thermometer column 30 against the inwardly convergent flat surfaces 17, 17 of the vertical V-groove 16. This provides a balanced holding action wherein the spring forces exerted by the arms 20, 20 are transmitted symmetrically via the thermometer column 30 to the flat surfaces 17, 17, developing reactions at the abutment areas which resist changes in angular orientation of the attachment 11 relative to the thermometer column 30. Thus, parallelism of the fiducial lines 27 and 28 with the thermometer scale lines, shown at 32 in FIG. 1, is constantly maintained at all slidably adjusted positions of the scale magnifier along the length of the thermometer column 30.

Due to the fact that the base block 13 and lens 14 are symmetrical with respect to the common transverse vertical plane 18 containing the corner of the groove 16, the magnifying indicator 11 may be employed either in the normal upright position on the instrument 30, shown in FIG. 1, or in an inverted position, if so desired, without any loss of accuracy. Such inversion may be necessary when reading scale values near the bottom end of the thermometer, or other columnar instrument on which the device is employed.

While a specific embodiment of an improved instrument scale magnifier has been disclosed in the foregoing description, it will be understood that various modifications within the scope of the invention may occur to those skilled in the art. Therefore it is intended that adaptations and modifications should and are intended to be comprehended within the meaning and range of equivalents of the disclosed embodiments.

what is claimed is:

1. A magnifying indicator for an elongated tubular instrument of the type having a linearly extending scale, said indicator comprising a main body including a base block and an upstanding lens rigidly secured on the base block, the rear portion of the base block being formed with a vertical groove in which the elongated instrument is receivable, and a spring arm connected to the rear portion of the base block and transversely overlying said groove and being resiliently engageable with such instrument to retain the instrument in the groove and to limit angular displacement of the instrument relative to the lens, wherein said spring arm comprises a generally U-shaped wire spring member having anchoring elements, said base block having bores adjacent one side of the groove lockingly receiving said anchoring elements.

2. The magnifying indicator of claim 1, and wherein said upstanding lens is rigidly secured on the front portion of the base block at a location opposite to the location of the groove.

3. The magnifying indicator of claim 1, and wherein said lens and base block are integrally formed of transparent material.

4. The magnifying indicator of claim 1, and wherein said groove and said lens are substantially symmetrical with respect to a common transverse median vertical plane.

5. The magnifying indicator of claim 1, and wherein said groove is substantially V-shaped and wherein said groove and said lens are substantially symmetrical with respect to a common transverse median vertical plane containing the corner of said vertical groove.

6. The magnifying indicator of claim 1, and wherein said anchoring elements comprise resilient hooks with sharpened ends penetrably engaged in the walls of said bores.

7. The magnifying indicator of claim 1, and wherein said lens and base block are integrally formed of transparent plastic material and wherein said lens is located at the front portion of the base block opposite the location of the vertical groove, said groove and said lens being substantially symmetrical with respect to a common transverse median vertical plane.

8. The magnifying indicator of claim 7, and wherein said groove is substantially V-shaped and has flat walls diverging from said common plane of symmetry.

9. The magnifying indicator of claim 8, and wherein said generally U-shaped wire spring member has a pair of end anchoring elements, said base block having a pair of vertically aligned bores adjacent one side of said groove lockingly receiving said anchoring elements, said anchoring elements comprising resilient hooks with sharpened ends penetrably engaged in the walls of said bores.

10. The magnifying indicator of claim 1, and wherein the lens is provided with horizontal fiducial lines on its front and rear surfaces, said fiducial lines being located in a common horizontal plane normal to the vertical direction of the groove, for eliminating parallax errors in reading the instrument scale.

11. The magnifying indicator of claim 10, and wherein said lens and said block are substantially symmetrical with respect to a common transverse median vertical plane, and wherein the lens is provided with respective pairs of said horizontal fiducial lines on its front and rear surfaces spaced apart and located substantially symmetrically relative to said common transverse vertical plane of symmetry of said lens and of said base block.

* * * * *